E. D. BURTON.
BUTTER OR CHEESE RECEPTACLE.
APPLICATION FILED JUNE 25, 1908.
958,991.
Patented May 24, 1910.
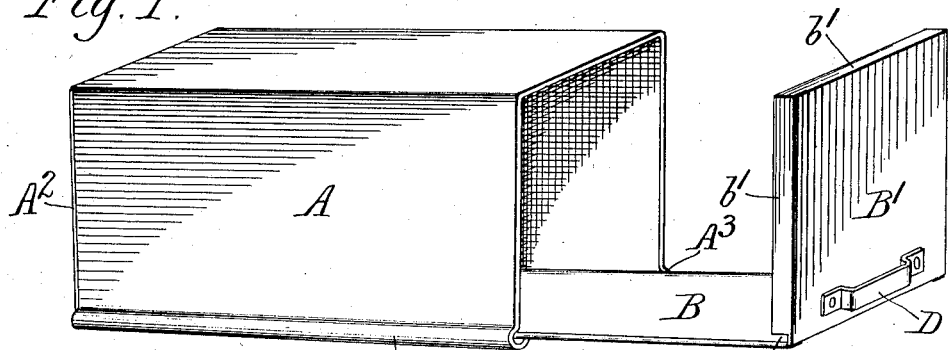
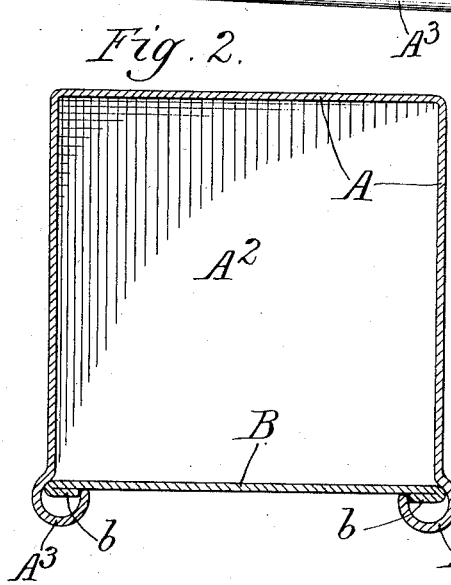
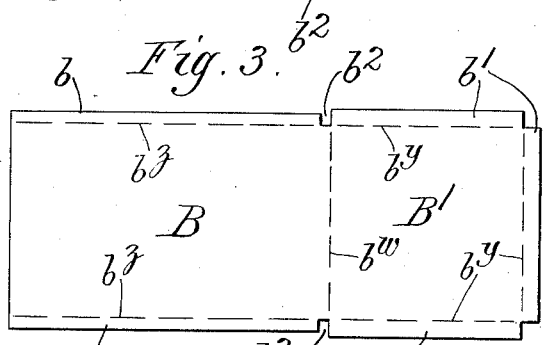
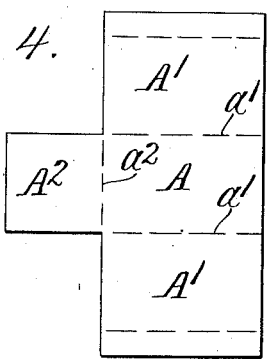
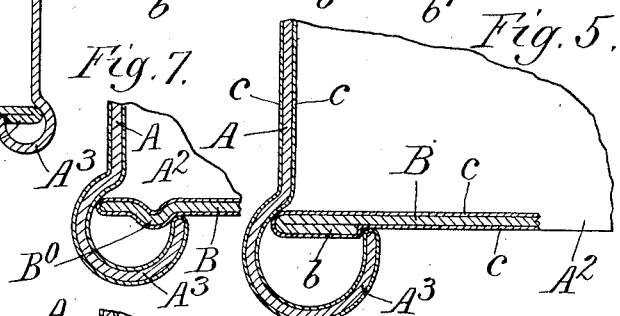
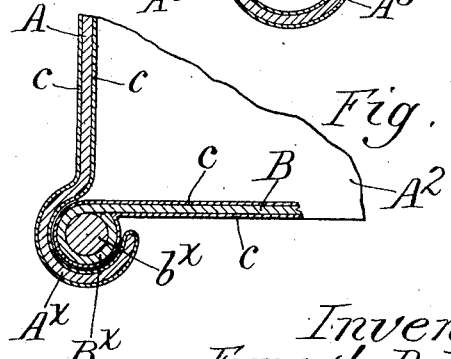
Witnesses.
Edward T. Wray.
J. S. Abbott
Inventor.
Ernest D. Burton,
by Burton & Burton
his Attys.

UNITED STATES PATENT OFFICE.

ERNEST D. BURTON, OF CHICAGO, ILLINOIS.

BUTTER OR CHEESE RECEPTACLE.

958,991. Specification of Letters Patent. Patented May 24, 1910.

Application filed June 25, 1909. Serial No. 440,337.

*To all whom it may concern:*

Be it known that I, ERNEST D. BURTON, a citizen of the United States, residing at Chicago, in the county of Cook and State of Illinois, have invented the new, useful, and Improved Butter or Cheese Receptacle, of which the following is a specification, reference being had to the accompanying drawings, forming a part thereof.

The purpose of this invention is to provide a receptacle particularly adapted for butter, cheese, or other food substance from which portions may be cut, the receptacle being adapted to permit such cutting and removal without handling the substance and without removing the bulk from its lodgment on the element of the receptacle on which it is carried, only the portion cut off being thus removed and the remainder being left in position undisturbed on the carrying element, and to provide such a receptacle in a form free from narrow or obscure crevices or corners in which remnants of the substance or impurity might become lodged, all parts of the article being fully exposed for cleansing in any proper manner.

The invention consists of the features of construction shown and described as indicated in the claims.

In the drawings: Figure 1 is a perspective view of a receptacle embodying the invention showing the carrying plate partly withdrawn. Fig. 2 is a transverse section of the same. Fig. 3 is a plan view of the blank from which the slide or carrying element is formed in one piece. Fig. 4 is a plan view on a reduced scale of a blank from which the body or inclosing element of the receptacle is formed in one piece. Fig. 5 is an enlarged detail transverse section through one corner of the device showing the material of both elements covered with plate or enamel upon both surfaces. Fig. 6 is a view similar to Fig. 5 showing a modified construction. Fig. 7 is a similar view of a further modification.

This receptacle is designed and proportioned for the purpose of containing a rectangular block or "brick" of butter or like material. As illustrated, it is proportioned to the customary form of one pound bricks of butter, which are substantially 3″ x 3″ x 5″. The proportions, however, are not material to the operation of the device. It comprises the inclosing case or box element, A, which is preferably made of one piece of sheet metal cut in the form shown in Fig. 4, and folded at the lines, $a^1$, $a^1$, $a^2$, to form the two opposite sides and one end, the edges of the two sides, $A^1$, $A^1$, being folded in about three-quarter-cylindrical form, as seen in the drawings, to form the slide-ways, $A^3$, for the slide or carrying element, B. Said element, B, is preferably formed from a single piece of sheet metal, shown in Fig. 3, which is folded transversely at the line, $b^w$, to form the end cap, $B^1$, said end cap being folded at the lines, $b^y$, $b^y$, $b^y$, to form the three flanges, $b^1$, which are adapted to embrace the open end of the receptacle, A, forming a cap cover for the same. The slide, B, is folded upon itself at $b^z$, $b^z$, parallel to its lateral edges to form the stop lip, $b$, on the lower side, the width of this lip being such as to permit it to enter and fit quite closely within the slide-way, $A^3$, as seen clearly in Figs. 2 and 5. The notches, $b^2$, $b^2$, in the blank shown in Fig. 3, permit the flanges, $b^1$, of the cap-end, $B^1$, of the slide to pass over the slide-ways, $A^3$, in closing up the open end of the receptacle. One purpose of the details of structure described is to make it possible to enamel both the receptacle and the slide upon both sides, so that all surfaces will be thoroughly protected and may be readily cleansed, and also to accomplish this purpose in such manner that the two parts may fit together by engagement in the slide-ways, $A^3$, closely, and at the same time without danger of binding unduly in case of slight inaccuracy or variation in the thickness of the enamel which is liable to occur; and a purpose also in mind in the details is to adapt the slide, B, to serve as a binder or connecting bar holding together the two opposite lower edges of the receptacle which are not otherwise connected and would be liable to spread unless tied together in some positive manner. The lip, $b$, folded on to the under side of the slide, B, by engaging in the three-quarter-cylindrical slide-ways, $A^3$, adapt the slide, B, to thus positively tie together the two opposite sides of the receptacle. It will be noticed that the three-quarter-cylindrical slide-ways, $A^3$, are not only by reason of their form, as stated, adapted to be enameled inside as well as outside, but are also adapted to be readily cleansed in the channel or slide-way passage.

Fig. 6 shows a detail modification of the form of junction between the slide and the receptacle. In this form, the lateral edges of the slide, B, are shown folded around a stiffening wire, $b^x$, and the slide-ways are proportioned to readily receive the cylindrical beads thus formed on the lateral edges of the slide, proper allowance being made in folding the metal for the space required for the double layers of enamel to be applied to the two parts.

It will be understood that the lip or fold, $b$, performs its function of engaging and tying together the two lower edges of the sides of the box by virtue of the shoulders which are formed by the inner edges of these inturned folds; and this method of construction is adapted primarily for the purpose of affording such shoulders; and a similar function is performed by the longitudinal beads of the structure shown in Fig. 6, made by enwrapping the stiffening wire, $b^x$, with the lateral edge portion of the slide. But both these constructions also serve the additional purpose of stiffening the edges of the slide. Both these purposes may be accomplished by forming the slide with a longitudinal corrugation at proper position to afford the necessary shoulder. Such construction is illustrated in Fig. 7, wherein the corrugation, $B^0$, is formed projecting from the lower side of the slide at such distance from the lateral edge as to be engaged by the edge of the slide-way when the edge of the slide is stopped against the opposite inner side of the slide-way.

It will be observed that in all the forms illustrated, the slide-way cavity or channel extends outwardly so as to lie vertically directly underneath the side wall of the box, and it will be recognized that the purpose of this feature of construction is to stop the slide-way against upward movement, as it is stopped against downward movement by its lodgment upon or in the slide-way, and this feature is essential to secure engagement of the two elements of the receptacle.

I claim:—

1. A food receptacle comprising two parts, one being a box open at the bottom and one end, the other being a slide having an upturned end, the lower edges of the sides of the box having inwardly open slide-ways and the slide having its lateral edges adapted to engage the slide-ways against spreading.

2. A food receptacle comprising a box-like element open at the bottom and at one end, and a slide having an upturned end, the box element having the lower edges of its sides folded inwardly in substantially three-quarters-cylindrical form, and the slide having its lateral edges reflexed upon its under surface to form marginal beads adapted to engage the slide-ways.

3. A food receptacle comprising a box element open at the bottom and one end, the lower edges of the sides being folded inwardly and upwardly so as to form wide-open longitudinal channels or slide-ways opening upwardly and inwardly with respect to the box, and a slide having an upturned end adapted to close the open end of the box, and having on the under side longitudinal shoulders parallel to its lateral edges for engaging the upturned edges of the box sides.

4. A food receptacle comprising a box element open at the bottom and one end, and a slide having an upturned end, the lower edges of the two sides of the box element being provided with upwardly and inwardly opening channels which extend outwardly past the vertical plane of the box sides so as to be overhung thereby, the slide having on its under side shoulders parallel to its lateral edges at such distance therefrom that said edges extend under the overhanging box sides when the shoulders are stopped against the inner edges of the channels.

5. A food receptacle comprising two parts, one part being a box open at the bottom and one end, the other being a slide having an up-turned end, each lateral edge of the slide being engaged with a corresponding longitudinal edge of the case by the infolding of the one about the other for stoppage in all transverse directions, the outer of said parts at each such engagement having its lines of contact with the opposite sides of the other part widely separated.

6. A food receptacle comprising two parts one being a box open at the bottom and one end, the other being a slide with an upturned end, each lateral edge of the slide being engaged with the corresponding longitudinal edge of the case said slide having all lateral longitudinal projections below its upper surface.

7. A food receptacle comprising two parts one being a box open at the bottom and one end, the other being a slide having an upturned end, each lateral edge of the slide being engaged with the corresponding lower longitudinal edge of the side of the case by the infolding of one of said parts about the other, such infolding feature being extended downwardly below the lower surface of the slide and constituting a longitudinal support for the structure.

In testimony whereof, I have hereunto set my hand at Chicago, Illinois, this 11th day of June, A. D., 1908.

ERNEST D. BURTON.

In the presence of—
EDWARD T. WRAY,
M. GERTRUDE ADY.